Sept. 25, 1928.

E. TESTEIL

DYNAMO ELECTRIC MACHINE

Filed Sept. 21, 1926

1,685,651

Inventor:
Emile Testeil,
by
His Attorney.

Patented Sept. 25, 1928.

1,685,651

UNITED STATES PATENT OFFICE.

EMILE TESTEIL, OF PARIS, FRANCE, ASSIGNOR TO GENERAL ELECTRIC COMPANY, A CORPORATION OF NEW YORK.

DYNAMO-ELECTRIC MACHINE.

Application filed September 21, 1926, Serial No. 136,827, and in France October 31, 1925.

My invention relates to dynamo-electric machines and particularly to such machines designed for operation in an explosive atmosphere.

It has for its object to prevent the leakage of oil out of the bearings of said machines which may occur when an explosion occurs within the machine, and also to prevent the issuance of flames out of the bearing, thus avoiding all danger of producing an explosion in the chamber containing the dynamo-electric machine.

In accordance with my invention, I provide means for preventing the escape of the products of combustion along the shaft of the machine, whenever an explosion occurs within the machine.

Figure 1:
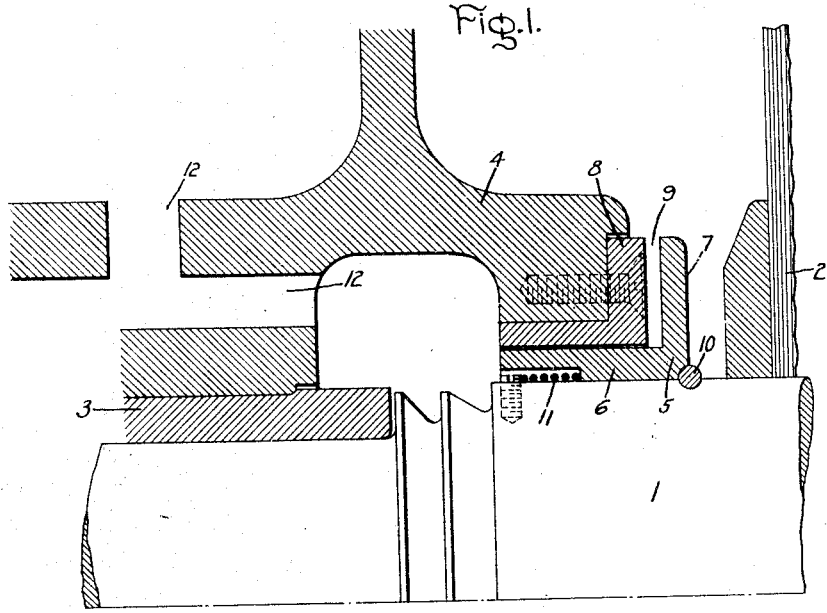
Figure 2:
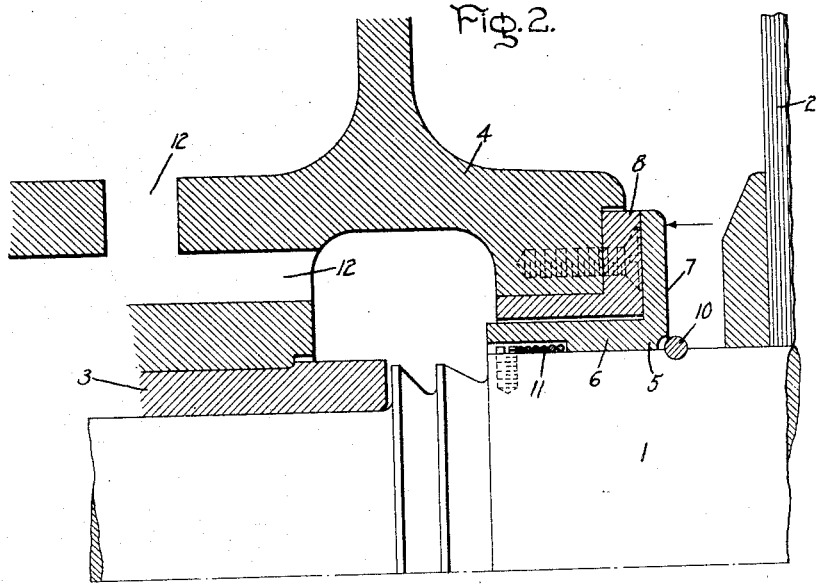

For a better understanding of my invention, reference may be had to the following description taken in connection with the accompanying drawing, in which Fig. 1 is a sectional view of a dynamo-electric machine embodying my invention with the parts in position for normal operation, and Fig. 2 is a view similar to Fig. 1 except that the parts are in position at the time an explosion occurs in the machine.

Referring to the drawing, 1 is a shaft of a dynamo-electric machine on which the armature 2 is mounted. The shaft is mounted in a bearing 3. The bearing 3 is supported by a bearing bracket 4. A steel or bronze member 5 surrounds and closely fits the shaft 1 but is longitudinally movable thereon. This member 5 comprises a cylindrical portion 6 surrounding the shaft and a flanged portion 7. The cylindrical portion 6 has a running clearance with the part 8 of the bearing bracket 4. Normally there is a clearance space 9 between the flange 7 and the part 8 as clearly shown in Fig. 1. A stop 10 is provided on the armature shaft for limiting the movement of the member 5 in one direction and a spring 11, which is shown as surrounding the shaft 1, presses against the member 5 to normally hold this member against the stop 10 and maintain the clearance space 9 between it and the bearing bracket.

During normal operation of the machine, the atmosphere in the interior of the dynamo-electric machine is in direct communication with the atmosphere surrounding the machine through the clearance space 9, the running clearance between the cylindrical portion 6 of the member 5 and the bearing bracket and through the opening 12 in the bearing bracket. When for some reason, such as friction or a short circuit, a spark is produced in the interior of the motor igniting the gases therein and causing an explosion, a considerable increase in the pressure in the interior of the machine is produced which may reach nine kilograms per square centimeter. The pressure produced by such an explosion acts on the inner surface of the flange portion 7 of the member 5 but even if some pressure is exerted on the outer surface of this cylindrical portion, the difference in area of these two surfaces is sufficient so that the member 5 will act as a valve and move to the position shown in Fig. 2 against the action of the spring 11 to close the clearance space 9 between the member 5 and the portion 8 of the bearing bracket, thus cutting off all communication between the interior of the dynamo-electric machine and the atmosphere external the machine. The escape of the products of combustion or reaction will now take place slowly and without any danger.

As the escape of the products of combustion occurs, the pressure exerted on the member 5 decreases and under the action of the spring 11, the sleeve is gradually brought back to its initial position.

My arrangement will prevent a leakage or forcing of the oil out of the bearing, will prevent the oil catching on fire and also prevent the danger of exploding the gases outside of the motor. My arrangement will also prevent the rapid escape of the products of combustion from the dynamo-electric machine.

I desire it to be understood that my invention is not limited to the particular arrangement shown and described and I aim in the appended claims to cover all modifications which do not depart from the spirit and scope of my invention.

What I claim as new and desire to secure by Letters Patent of the United States, is:

1. In a dynamo-electric machine, a shaft for the armature of said dynamo-electric machine, a bearing for said shaft, a bracket supporting said bearing, and means movable by the pressure produced by an explosion in said machine for preventing the escape of the products of combustion along said shaft.

2. In a dynamo-electric machine, a shaft for the armature of said dynamo-electric machine, a bearing for said shaft, a bracket supporting said bearing, and means surrounding said shaft and movable by the pressure produced by an explosion in said machine for preventing the escape of the products of combustion along said shaft and through said bearings.

3. In a dynamo-electric machine, a shaft for the armature of said dynamo-electric machine, a bearing for said shaft, a bracket supporting said bearing, and a valve operated by the pressure produced by an explosion in said machine for preventing the escape of the products of combustion along said shaft.

4. In a dynamo-electric machine, a shaft for the armature of said dynamo-electric machine, a bearing for said shaft, a bracket supporting said bearing, and a valve operated by the pressure produced by an explosion in said machine for preventing the escape of the products of combustion along said shaft and through said bearings.

5. In a dynamo-electric machine, a shaft for the armature of said dynamo-electric machine, a bearing for said shaft, a bracket supporting said bearing, and a member surrounding and closely fitting said shaft but longitudinally movable thereon, said member normally having a clearance space between it and said bracket, said member being designed to move to close said clearance space upon the occurrence of an explosion within said machine.

6. In a dynamo-electric machine, a shaft for the armature of said dynamo-electric machine, a bearing for said shaft, a bracket supporting said bearing, a member surrounding and closely fitting said shaft but longitudinally movable thereon, said member normally having a clearance space between it and said bracket, and a spring acting on said member to maintain said clearance space between said member and said bracket, said member being designed to move to close said clearance space upon the occurrence of an explosion within said machine.

In witness whereof, I have hereunto set my hand this 27th day of August, 1926.

EMILE TESTEIL.